United States Patent Office.

WILLIAM BLACKBURN, OF MARION, OHIO, ASSIGNOR OF TWO-THIRDS TO EBER A. GURLEY, OF SAME PLACE, AND WALTER SHULL, OF GALION, OHIO.

COMPOUND FOR PREVENTING INCRUSTATION IN BOILERS.

SPECIFICATION forming part of Letters Patent No. 439,756, dated November 4, 1890.

Application filed September 5, 1890. Serial No. 364,072. (No specimens.)

*To all whom it may concern:*

Be it known that I, WILLIAM BLACKBURN, of Marion, in the county of Marion and State of Ohio, have invented a certain new and useful Boiler Compound; and I do hereby declare the following to be a full, clear, and exact description of the invention, such as will enable others skilled in the art to which it pertains to make and use the same.

My invention relates to an improved composition for removing scales from steam-boilers and preventing their formation.

My composition consists of the following ingredients, approximately combined in the proportions stated, viz: hydrocarbon oil, one gallon; rice, one-fourth pound; starch, one-fourth pound. These ingredients are to be thoroughly mingled by agitation.

The composition is preferably placed in the boiler before the latter is charged with water. The quantity of composition required will of course depend on the size of the boiler and the amount of impurities contained in the feed-water.

The boiler compounds heretofore used were objectionable in that they were too caustic and the boilers and flues were rendered more or less leaky at the seams.

With my improved composition this objectionable feature is entirely overcome.

What I claim is—

The herein-described composition of matter, consisting of hydrocarbon oil, starch, and rice, in approximately the proportions specified.

In testimony whereof I sign this specification, in the presence of two witnesses, this 27th day of August, 1890.

WILLIAM BLACKBURN.

Witnesses:
 W. M. BOZMAN,
 CHARLES C. FISHER.